US012756022B2

(12) United States Patent
Ito

(10) Patent No.: US 12,756,022 B2
(45) Date of Patent: Oct. 6, 2026

(54) ENERGY STORAGE APPARATUS AND CONTROL METHOD FOR CURRENT INTERRUPTING DEVICE

(71) Applicant: GS Yuasa International Ltd., Kyoto (JP)

(72) Inventor: Ryuichi Ito, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 514 days.

(21) Appl. No.: 18/556,438

(22) PCT Filed: Mar. 17, 2022

(86) PCT No.: PCT/JP2022/012204

§ 371 (c)(1),
(2) Date: Nov. 7, 2023

(87) PCT Pub. No.: WO2022/224649

PCT Pub. Date: Oct. 27, 2022

(65) Prior Publication Data

US 2024/0363911 A1 Oct. 31, 2024

(30) Foreign Application Priority Data

Apr. 23, 2021 (JP) ................................ 2021-073213

(51) Int. Cl.
*H01M 10/42* (2006.01)
*F02N 11/08* (2006.01)
(Continued)

(52) U.S. Cl.
CPC ........ *H01M 10/425* (2013.01); *G07C 5/0808* (2013.01); *H01M 10/48* (2013.01); (Continued)

(58) Field of Classification Search
CPC .. H01M 10/425; H01M 10/48; H01M 50/574; H01M 2010/4271;
(Continued)

(56) References Cited

U.S. PATENT DOCUMENTS 5,549,325 A * 8/1996 Kiribayashi ........ B60R 21/0173 180/274
5,793,121 A * 8/1998 Burgess .................... B60L 3/04 361/115
(Continued)

FOREIGN PATENT DOCUMENTS

JP 06-025910 U 4/1994
JP H08-180269 A 7/1996
(Continued)

OTHER PUBLICATIONS

International Search Report and Written Opinion for International Application No. PCT/JP2022/012204, dated May 10, 2022, (9 pages), Japan Patent Office, Tokyo, Japan.

*Primary Examiner* — Dharti H Patel
(74) *Attorney, Agent, or Firm* — Buchalter LLP

(57) ABSTRACT

An energy storage apparatus 50 includes an energy storage cell 62, a current interruption device 53 that interrupts a current I to the energy storage cell 62 and a control unit 121. The control unit 121 interrupts a current by opening the current interruption device 53 in a case where abnormality of the energy storage apparatus 50 is detected together with a vehicle crash, and resumes the supply of electricity to a vehicle, which has been crashed, by closing the current interruption device 53 in a case where the abnormality is no longer detected.

11 Claims, 12 Drawing Sheets

(51) Int. Cl.
*G07C 5/08* (2006.01)
*H01M 10/48* (2006.01)
*H01M 50/574* (2021.01)

(52) U.S. Cl.
CPC ....... *H01M 50/574* (2021.01); *F02N 11/0862* (2013.01); *H01M 2010/4271* (2013.01); *H01M 2200/00* (2013.01); *H01M 2220/20* (2013.01)

(58) Field of Classification Search
CPC ......... H01M 2200/00; H01M 2220/20; H01M 50/209; H01M 50/242; H01M 50/249; H01M 50/583; G07C 5/0808; F02N 11/0862; H02J 2105/37; H02J 7/685; H02H 7/18; Y02E 60/10
USPC .......................................................... 361/93.1
See application file for complete search history.

(56) References Cited

U.S. PATENT DOCUMENTS

| | | | | |
|---|---|---|---|---|
| 6,243,245 | B1 * | 6/2001 | Totsuka | H01H 85/46 361/103 |
| 7,345,383 | B2 * | 3/2008 | Zushi | H03K 17/18 307/130 |
| 7,460,344 | B2 * | 12/2008 | Hastings | H02H 7/18 361/42 |
| 2008/0088279 | A1 | 4/2008 | Lim et al. | |
| 2009/0015976 | A1 * | 1/2009 | Hara | B60R 16/023 361/64 |
| 2015/0016002 | A1 * | 1/2015 | He | G01R 19/0092 361/87 |
| 2015/0094901 | A1 * | 4/2015 | Brenneis | B60R 16/03 701/1 |
| 2015/0175002 | A1 * | 6/2015 | Lee | B60K 28/14 701/36 |
| 2016/0036029 | A1 * | 2/2016 | Tononishi | H01M 50/271 429/121 |
| 2016/0336626 | A1 * | 11/2016 | Kawauchi | H02J 7/60 |
| 2017/0154482 | A1 * | 6/2017 | Osborne | E05F 15/77 |
| 2019/0140225 | A1 * | 5/2019 | Inoue | H01M 10/441 |
| 2020/0106082 | A1 * | 4/2020 | Fukushima | B60L 3/0046 |
| 2023/0028076 | A1 * | 1/2023 | Yasunori | B60R 16/023 |
| 2026/0079546 | A1 * | 3/2026 | Aal | G06F 1/189 |

FOREIGN PATENT DOCUMENTS

| | | | |
|---|---|---|---|
| JP | H10-194007 | A | 7/1998 |
| JP | 2008-098171 | A | 4/2008 |
| JP | 2015-120494 | A | 7/2015 |
| JP | 2017-005985 | A | 1/2017 |
| JP | 2017-060251 | A | 3/2017 |
| JP | 2020-128109 | A | 8/2020 |
| WO | WO-2019/009292 | A | 1/2019 |

* cited by examiner

Fig. 8

| | Short circuit object present | Short circuit object not present |
|---|---|---|
| Voltage at point A | 0V | Ev |

ENERGY STORAGE APPARATUS AND CONTROL METHOD FOR CURRENT INTERRUPTING DEVICE

CROSS REFERENCE TO RELATED APPLICATIONS

This application is a National Stage Application, filed under 35 U.S.C. § 371, of International Application No. PCT/JP2022/012204, filed Mar. 17, 2022, which international application claims priority to and the benefit of Japanese Application No. 2021-073213, filed Apr. 23, 2021; the contents of both of which are hereby incorporated by reference in their entirety.

BACKGROUND

Technical Field

The present invention relates to a technique for enhancing safety of a vehicle by securing a power source in emergency.

Description of Related Art

An in-vehicle battery includes a current interruption device as one of protective devices. When any abnormality is detected, by opening a current interruption device thus cutting off a current, a battery can be protected (see Patent Document JP-A-2017-5985).

As one of the above-mentioned abnormalities, an external short circuit has been known. In a case of reusing a battery, to which the supply of current has been interrupted along with the occurrence of an external short circuit, if the external short circuit is still continued, there is a possibility that a large current flows when the current interruption device is returned to a closed state. Patent Document WO 2019/9292 discloses a technique that determines the presence or non-presence of a short circuit object that causes a short circuit between external terminals.

BRIEF SUMMARY

When a vehicle crash occurs, there is a possibility that an energy storage apparatus such as a battery is heavily damaged more than expected. In view of the above, when an abnormality occurs in the energy storage apparatus due to a vehicle crash, an idea is considered where, even when abnormality is eliminated after the current interruption device is opened, the interruption of a current is maintained thus securing safety of the energy storage apparatus.

However, due to the interruption of a current, the supply of electricity to the crashed vehicle from the energy storage apparatus is stopped. Accordingly, even when a vehicle has a post-crash function (post-crash safety function) such as an emergency call, there is a possibility that such function cannot be used. Even in a case where the vehicle does not have a post-crash function, it is desirable to secure electricity for performing an emergency action for securing safety of a vehicle such as moving the vehicle to a safe place.

According to an aspect of the present invention, there is disclosed a technique where, even in a case an abnormality occurs in an energy storage apparatus due to a crash, when such an abnormality is eliminated, the supply of electricity to vehicle is resumed by assigning priority to safety of a vehicle, thus enhancing safety of the vehicle after the crash.

An energy storage apparatus according to one aspect of the present invention includes: an energy storage cell; a current interruption device that interrupts a current to the energy storage cell; and a control unit. The control unit opens the current interruption device so as to interrupt a current in a case where the control unit detects an abnormality in the energy storage apparatus due to a crash of a vehicle, and closes the current interruption device so as to resume the supply of electricity to the vehicle, which has been crashed, in case where the abnormality is no longer detected.

This technique may be implemented as a method for controlling the current interruption device.

According to the above-mentioned aspect of the present invention, even when an abnormality occurs in the energy storage apparatus due to a crash, when such an abnormality is eliminated, the supply of electricity to a vehicle is resumed by assigning priority to safety of a vehicle thus enhancing safety of the vehicle after the crash.

BRIEF DESCRIPTION OF THE FIGURES

FIG. 8 is a table illustrating a change in voltage at a point A.

DETAILED DESCRIPTION OF VARIOUS EMBODIMENTS

Figure 1:
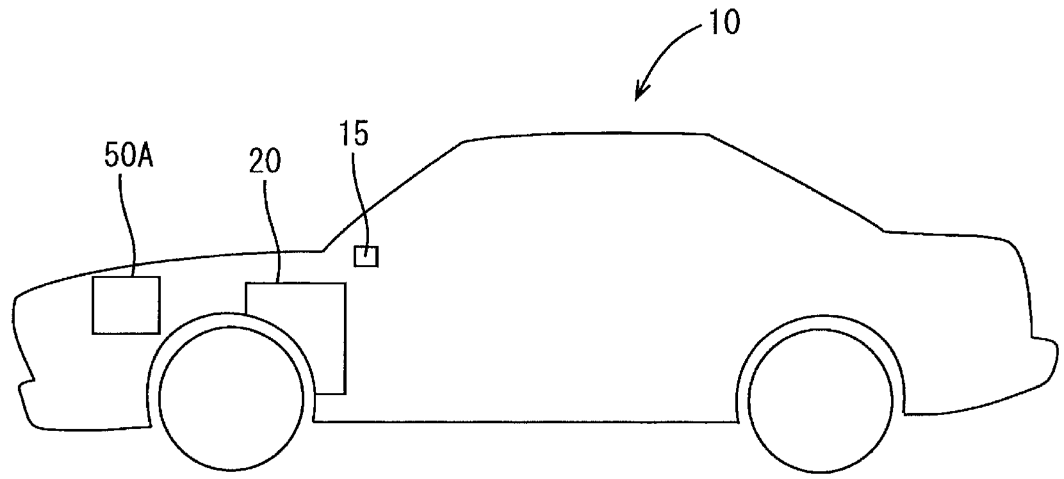
FIG. 1 is a side view of an automobile.

An overall configuration of an energy storage apparatus according to an embodiment of the present invention will be described.

An energy storage apparatus includes: an energy storage cell; a current interruption device that interrupts a current to the energy storage cell; and a control unit. The control unit opens the current interruption device so as to interrupt a current in a case where the control unit detects an abnormality in the energy storage apparatus due to a crash of a vehicle, and closes the current interruption device so as to resume the supply of electricity to the vehicle, which has been crashed, in a case where the abnormality is no longer detected.

With the above-mentioned configuration, in a case where abnormality occurs in the energy storage apparatus due to the occurrence of a crash, first of all, a current is interrupted so as to secure safety of an energy storage apparatus. Then, the abnormal state of the energy storage apparatus is eliminated, the current interruption device is returned to a close state so that the supply of electricity to the vehicle is resumed.

When the supply of electricity is resumed, in the vehicle, it is possible to use post-crash functions such as a hazard lamp, and an emergency call. Even in a case where the vehicle does not have the post-crash functions, by resuming the supply of electricity, it is possible to ensure electricity for performing an emergency action for securing safety of the vehicle such as moving the crashed vehicle to a safe place. Accordingly, the safety of the vehicle after a crash can be enhanced while protecting the energy storage apparatus.

The energy storage apparatus may include a pair of external terminals that are electrically connected to the energy storage cell and connect a vehicle load to the energy storage apparatus, and the abnormality may be a short circuit between the pair of external terminals caused by a vehicle crash.

With such a configuration, it is possible to protect the energy storage apparatus from an external short circuit caused by a vehicle crash, and it is possible to resume the supply of electricity to the vehicle that has crashed when an external short circuit is eliminated. By interrupting a short-circuit current, it is possible to suppress the generation of abnormal heat in components to which electricity is supplied such as a bus bar and the energy storage cell, and to suppress damage to the energy storage apparatus. Furthermore, the lowering of a discharge capacity of the energy storage cell can be suppressed by the interruption of a short-circuit current and hence, it is easy to secure electricity to be supplied to the vehicle that has crashed after resuming the supply of electricity.

The control unit may be connected to a vehicle ECU via communication, and may share information relating to the vehicle crash with the vehicle ECU.

With such a configuration, when the vehicle crash occurs, the control unit can receive a notification of the crash from the vehicle ECU. In a case where the current to the energy storage apparatus is to be interrupted for protection of the energy storage apparatus after the occurrence of the vehicle crash, information indicating that the current will be interrupted can also be transmitted to the vehicle that has been crashed prior to performing the interruption of the current.

The energy storage apparatus may incorporate an acceleration sensor therein, and the control unit may detect a vehicle crash based on a measured value obtained by the acceleration sensor.

With such a configuration, even when a communication line between the energy storage apparatus and the vehicle is disconnected due to an impact of the crash, the vehicle crash can be detected by the acceleration sensor incorporated in the energy storage apparatus. Accordingly, when an abnormality of the energy storage apparatus is eliminated, by returning the current interruption device to a closed state, it is possible to resume the supply of electricity to the vehicle that has been crashed.

Hereinafter, embodiments of the present invention will be described in detail with reference to the drawings.

Embodiment 1

1. Description of Battery 50A

As illustrated in FIG. 1, on an automobile 10, an acceleration sensor 15, an engine 20, and a battery 50A that is used at the time of starting the engine 20 or the like are mounted. In this embodiment, only one battery 50A (a battery of a low voltage such as 12V) is mounted on the automobile 10. However, a plurality of batteries may be mounted on the automobile 10. Alternatively, the battery 50A may be a 12V battery that enables starting of a battery of a high voltage for driving a vehicle. The battery 50A is an example of "energy storage apparatus".

Figure 2:
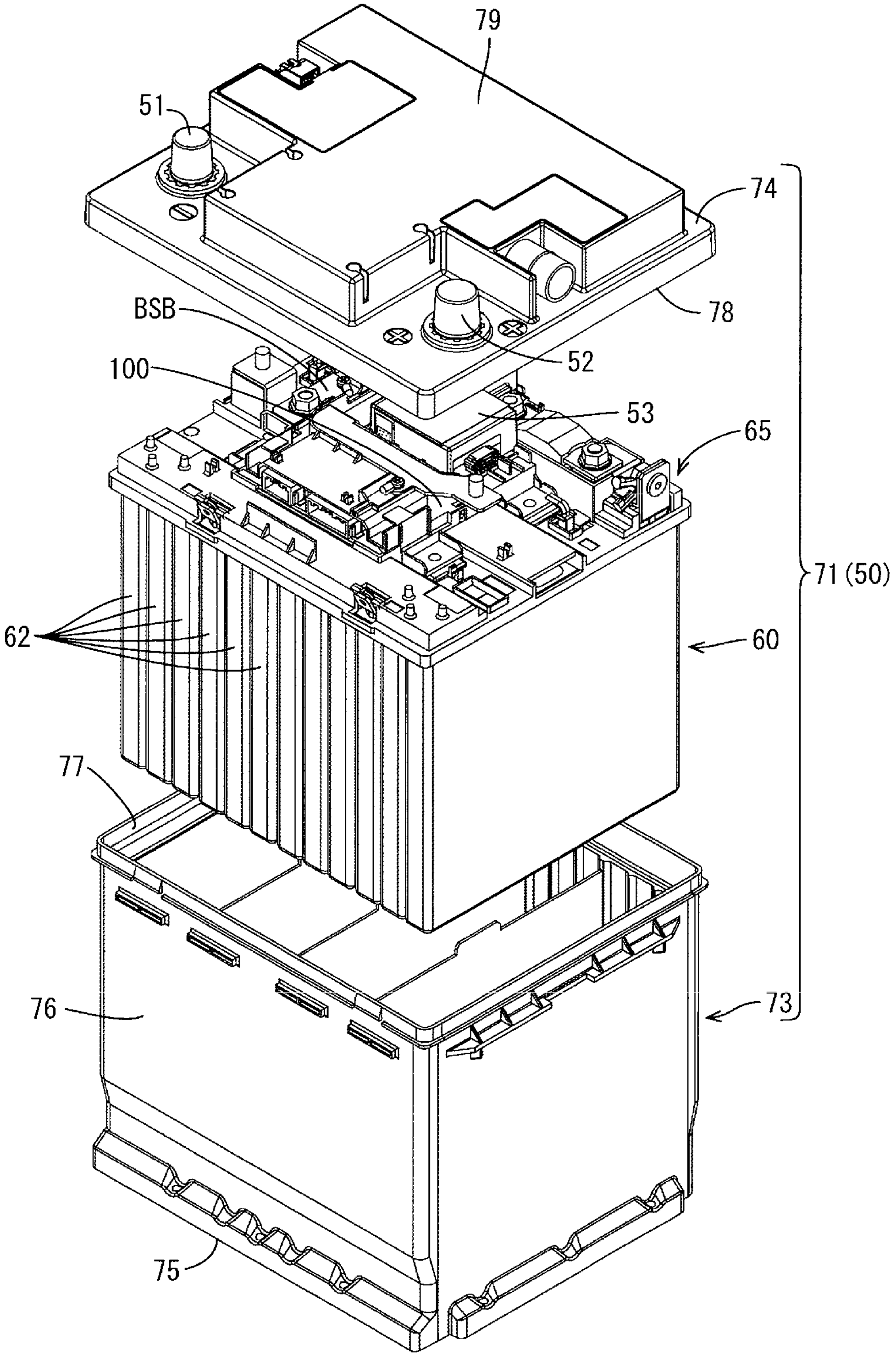
FIG. 2 is an exploded perspective view of a battery.

As illustrated in FIG. 2, the battery 50A includes an assembled battery 60, a circuit board unit 65, and a container 71 that is a housing. The container 71 includes a body 73 made of a synthetic resin material, and a lid body 74. The main body 73 has a bottomed cylindrical shape, and includes a bottom surface portion 75 and four side surface portions 76. An opening portion 77 is formed at an upper end of the main body 73 by four side surface portions 76.

The container 71 contains the assembled battery 60 and the circuit board unit 65. The circuit board unit 65 is a board unit where various components (the current interruption device 53, a current detection unit 54, a management device 110, and the like illustrated in FIG. 6) are mounted on the circuit board 100. The circuit board unit 65 is disposed, for example, above and adjacent to the assembled battery 60 as illustrated in FIG. 2. Alternatively, the circuit board unit 65 may be disposed adjacent to a side of the assembled battery 60.

The lid body 74 closes the opening portion 77 of the body 73. An outer peripheral wall 78 is formed on a periphery of the lid body 74. The lid body 74 has a protruding portion 79 having an approximately T shape as viewed in a plan view. On a front portion of the lid body 74, an external terminal 51 of a positive electrode is fixed to one corner portion, and an external terminal 52 of a negative electrode is fixed to the other corner portion. The circuit board unit 65 may be accommodated in the lid body 74 (for example, in a protruding portion 79) of the lid body in place of the main body 73 of the container 71.

Figure 4:
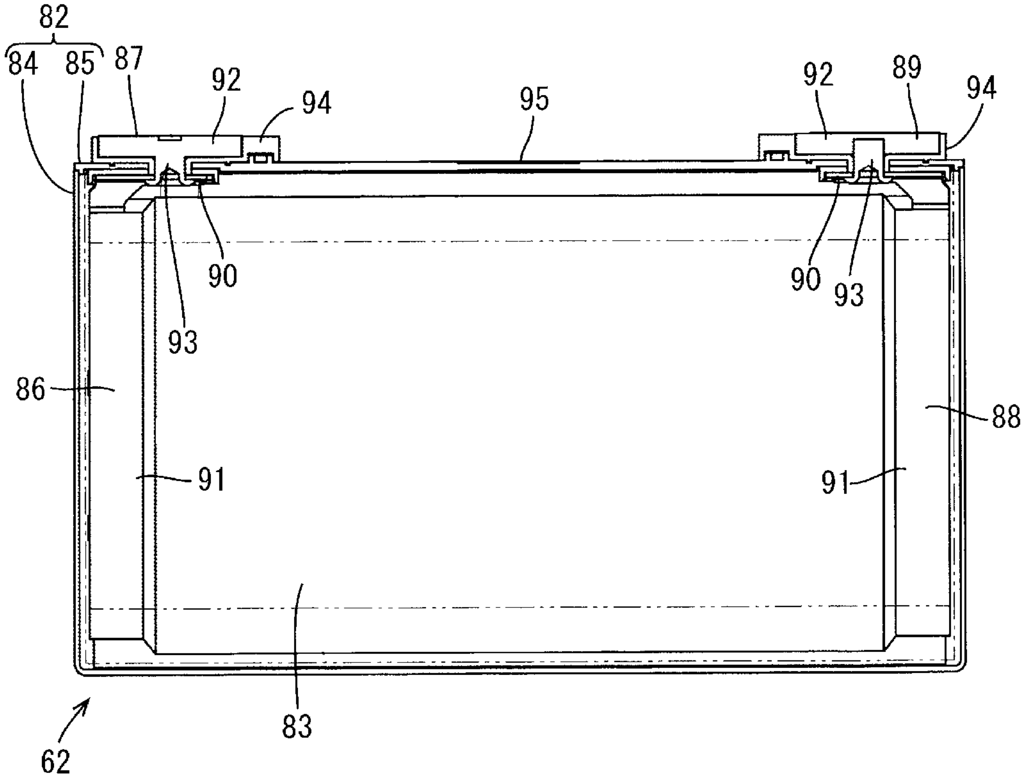
FIG. 4 is a cross-sectional view of the secondary battery cell taken along a line A-A in FIG. 3.

The assembled battery 60 includes a plurality of cells 62. As illustrated in FIG. 4, the cell 62 is configured such that an electrode assembly 83 is accommodated in a case 82 having a rectangular parallelepiped shape (a prismatic shape) together with a nonaqueous electrolyte. The cell 62 is, for example, a lithium ion secondary battery cell. The case 82 includes: a case body 84; and a lid 85 that closes an opening portion formed at an upper portion of the case body 84.

Although not illustrated in detail, the electrode assembly 83 is formed such that a separator formed of a porous resin film is disposed between a negative electrode plate that is formed by applying an active material to a substrate formed of a copper foil, and a positive electrode plate that is formed by applying an active material to a substrate formed of an aluminum foil. These elements all have a strip shape, and are wound in a flat shape so as to be accommodated in the case body 84 in a state where the position of the negative electrode plate and the position of the positive electrode plate are displaced toward opposite sides in the width direction with respect to the separator.

A positive electrode terminal 87 is connected to the positive electrode plate via a positive electrode current collector 86, and a negative electrode terminal 89 is connected to the negative electrode plate via a negative electrode current collector 88. The positive electrode current collector 86 and the negative electrode current collector 88 are each formed of a pedestal portion 90 having a flat plate-like and a leg portion 91 extending from the pedestal portion 90. A through hole is formed in the pedestal portion 90. The leg portion 91 is connected to the positive electrode plate or the negative electrode plate.

Figure 3:
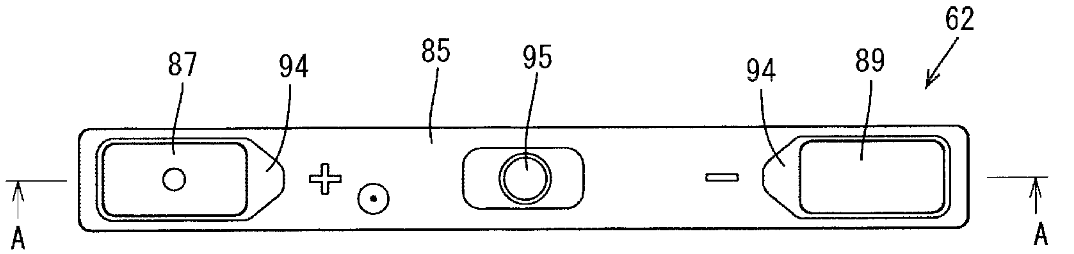
FIG. 3 is a plan view of a secondary battery cell.

The positive electrode terminal 87 and the negative electrode terminal 89 each include: a terminal body portion 92; and a shaft portion 93 protruding downward from a center portion of a lower surface of the terminal body portion 92. The terminal body portion 92 and the shaft portion 93 of the positive electrode terminal 87 are integrally formed with each other using aluminum (a single material). In the negative electrode terminal 89, the terminal body portion 92 is made of aluminum, and the shaft portion 93 is made of copper. The negative electrode terminal 89 is formed by assembling the terminal body portion 92 and the shaft portion 93 to each other. The terminal body portion 92 of the positive electrode terminal 87 and the terminal body portion 92 of the negative electrode terminal 89 are disposed at both end portions of the lid 85 via gaskets 94 each made of an insulating material. As illustrated in FIG. 3, the terminal body portion 92 of the positive electrode terminal 87 and the terminal body portion 92 of the negative electrode terminal 89 are exposed outward from the gaskets 94.

The lid 85 has a pressure release valve 95. The pressure release valve 95 is positioned between the positive electrode terminal 87 and the negative electrode terminal 89. The pressure release valve 95 is released so as to lower the internal pressure in the case 82 when an internal pressure in the case 82 exceeds a limit value.

Figure 5:
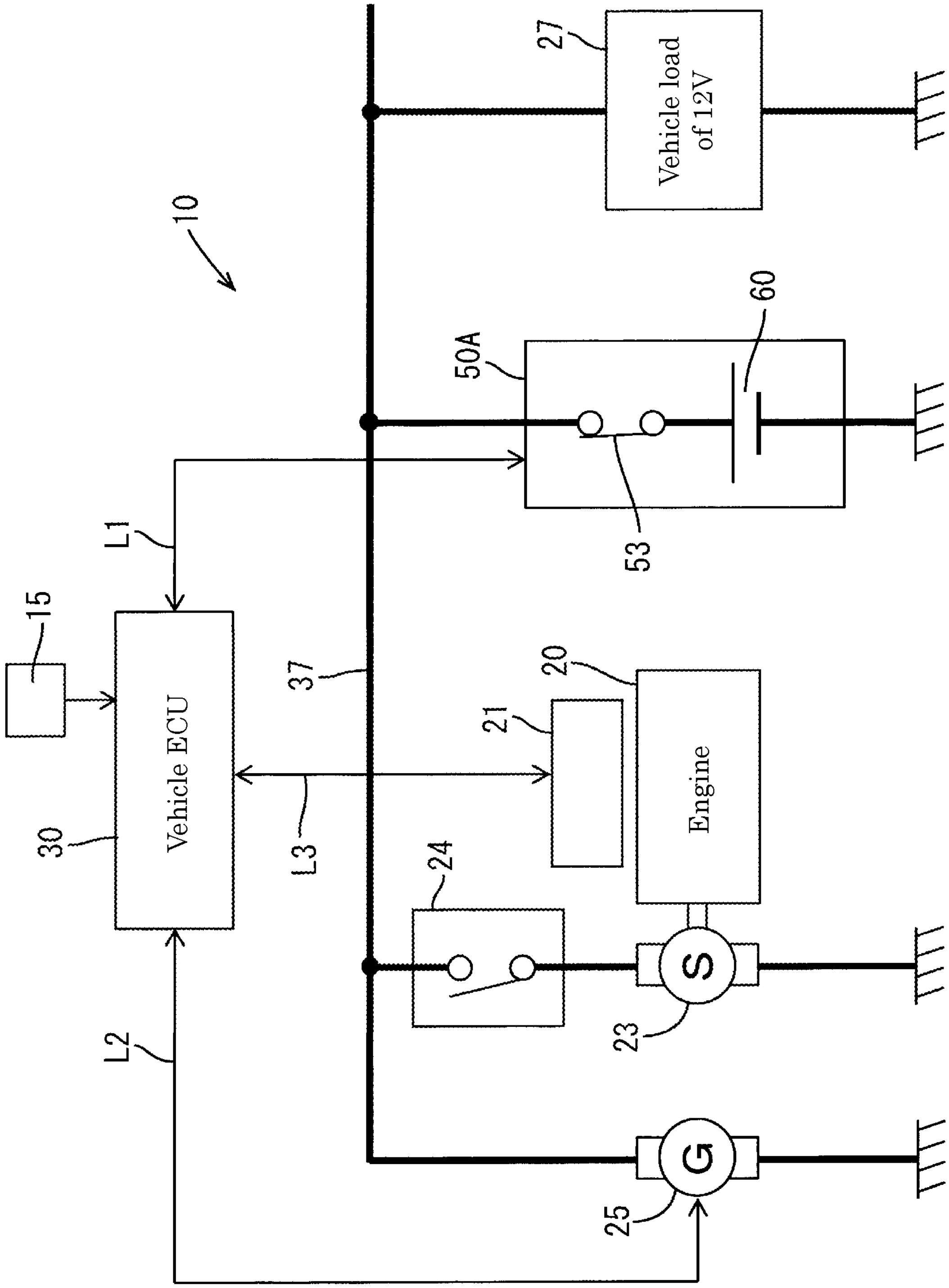
FIG. 5 is a block diagram illustrating an electrical configuration of the automobile.

FIG. 5 is a block diagram illustrating an electrical configuration of the automobile 10.

As illustrated in FIG. 5, the automobile 10 includes: the engine 20 that is a driving device, an engine control unit 21, an engine starting device 23, an alternator 25 that is a generator of the vehicle, a vehicle load 27, a vehicle electronic control unit (ECU) 30, the battery 50A, and the like.

The battery 50A is connected to a power supply line 37. The engine starting device 23, the alternator 25, and the vehicle load 27 are connected to the battery 50A via the power supply line 37.

The engine starting device 23 includes a starter motor. When an ignition switch 24 is turned on, a cranking current flows from the battery 50A, and the engine starting device 23 is driven. A crankshaft is rotated by driving the engine starting device 23 so that the engine 20 is started.

The vehicle load 27 indicates an electric load mounted on the automobile 10 other than the engine starting device 23. The vehicle load 27 has a rated voltage of 12V. As the vehicle load 27, an air conditioner, an audio system, a car navigation system, an auxiliary device and the like can be exemplified. The vehicle ECU 30 is also included in the vehicle load 27.

The alternator 25 is a vehicle generator that generates electricity using power of the engine 20. In a case where a power generation amount of the alternator 25 exceeds a power consumption amount consumed by the vehicle load 27, the battery 50A is charged by the alternator 25. In a case where a power generation amount of the alternator 25 is smaller than a power consumption amount consumed by the vehicle load 27, the battery 50A is discharged so as to compensate for a shortage of the power generation amount.

The vehicle ECU 30 is communicably connected to the battery 50A via a communication line L1, and is communicably connected to the alternator 25 via a communication line L2. The vehicle ECU 30 receives the information relating to a state of charge (SOC) from the battery 50A, and controls the SOC of the battery 50A by controlling a power generation amount of the alternator 25.

The vehicle ECU 30 is communicably connected to the engine control unit 21 via a communication line L3. The engine control unit 21 is mounted on the automobile 10, and monitors an operation state of the engine 20. Further, the engine control unit 21 monitors a traveling state of the automobile 10 based on measured values of meters such as a speed measuring instrument. The vehicle ECU 30 can obtain information relating to whether the ignition switch 24 is turned on or off, information relating to an operation state of the engine 20, and information relating to a traveling state (traveling, traveling stopped, idling stop or the like) of the automobile 10 from the engine control unit 21.

Figure 6:
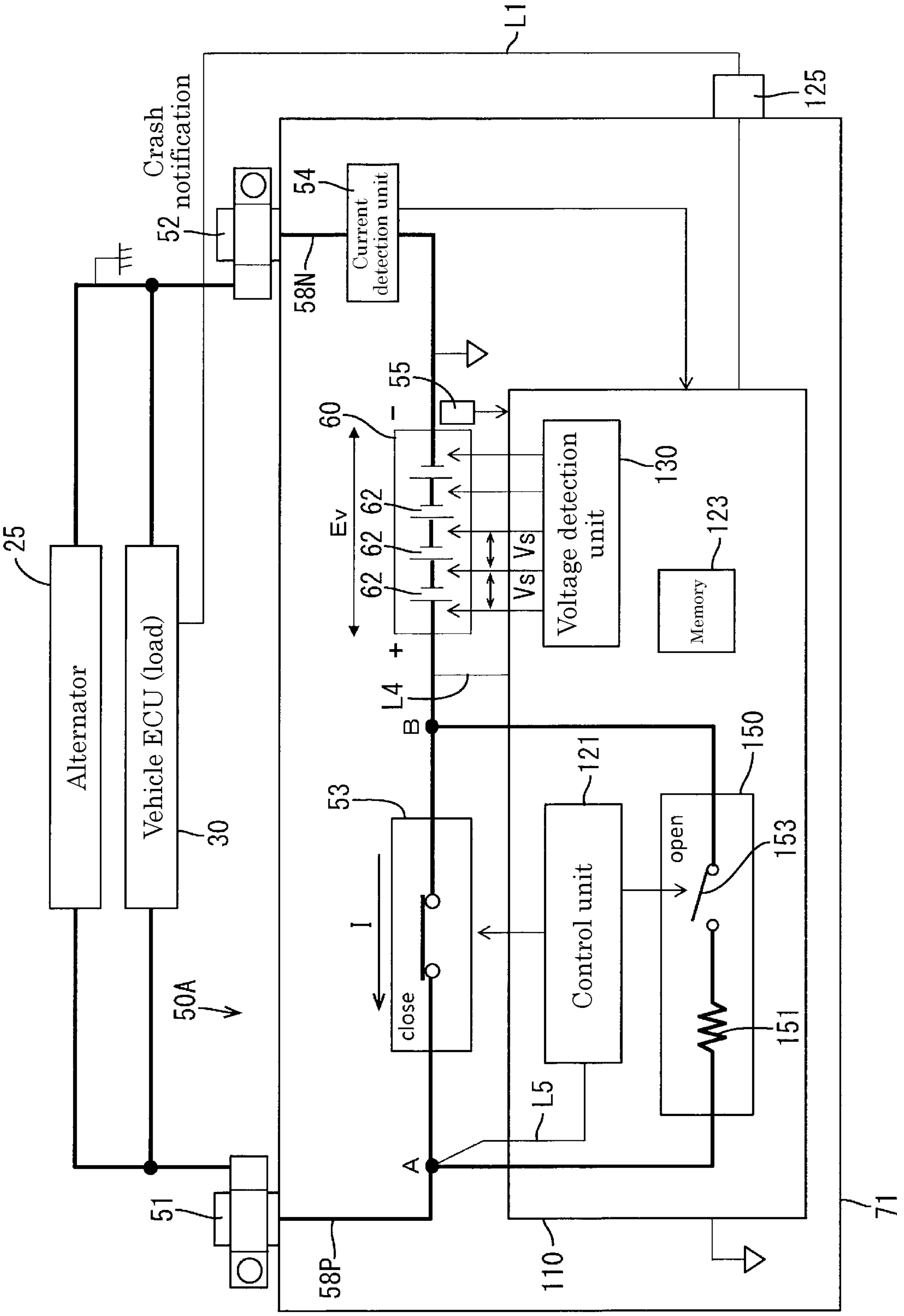
FIG. 6 is a block diagram of the battery.

FIG. 6 is a block diagram illustrating an electrical configuration of the battery 50A. The battery 50A includes the assembled battery 60, the current interruption device 53, the current detection unit 54, a temperature sensor 55, and the management device 110.

For example, twelve cells 62 of the assembled battery 60 (see FIG. 2) are connected with each other in three parallels and four series. In FIG. 6, three cells 62 that are connected in parallel are indicated by one battery symbol. The cell 62 is an example of an "energy storage cell". The energy storage cell is not limited to a prismatic cell, and may be a cylindrical cell or a pouch cell having a laminate film case.

The assembled battery 60, the current interruption device 53, and the current detection unit 54 are connected in series via a power line 58P and a power line 58N. As the power lines 58P, 58N, a bus bar BSB (see FIG. 2) which is a plate-like conductor made of a metal material such as copper can be used.

As illustrated in FIG. 6, the power line 58P connects a positive external terminal 51 and a positive electrode of the assembled battery 60 to each other. The power line 58N connects the external terminal 52 of the negative electrode and the negative electrode of the assembled battery 60 to each other. The external terminals 51 and 52 are terminals for connecting the battery 50A to the automobile 10 (vehicle load 27). The battery 50A can be electrically connected to the alternator 25 and the engine starting device 23 via the external terminals 51 and 52.

The current interruption device 53 is provided to the positive power line 58P. The current interruption device 53 may be a semiconductor switch such as an FET or a relay having a mechanical contact. It is preferable that the current interruption device 53 be a self-holding switch such as a latch relay. The current interruption device 53 is a normally closed type, and is controlled to be held in a closed state in a normal operation state. When an abnormality occurs in the battery 50A, a current I of the assembled battery 60 can be interrupted by changing over the current interruption device 53 from a closed state to an open state.

The current detection unit 54 is provided to the power line 58N of the negative electrode. The current detection unit 54 measures a current I of the assembled battery 60. The current detection unit 54 may be formed of a shunt resistor. The current detection unit 54 of a resistance type can determine discharging and charging of electricity based on the polarity (positive or negative) of a voltage. Alternatively, the current detection unit 54 may be a magnetic sensor. The temperature sensor 55 is a contact-type sensor or a non-contact-type sensor, and measures a temperature [° C.] of the assembled battery 60 or a temperature of the surrounding of the assembled battery 60.

The management device 110 is mounted on the circuit board 100 (see FIG. 2), and includes a control unit 121, a memory 123, a voltage detection unit 130, and a voltage applying circuit 150 as illustrated in FIG. 6. The management device 110 is connected to the positive electrode of the assembled battery 60 by a power supply line L4. The management device 110 is operated using the assembled battery 60 as a power source.

The voltage detection unit 130 is connected to both ends of each cell 62 by signal lines, and measures a cell voltage Vs of each cell 62. Further, the voltage detection unit 130 measures a total voltage Ev of the assembled battery 60 based on the cell voltages Vs of the respective cells 62. The total voltage Ev of the assembled battery 60 is the total voltage of the voltages of the cells 62 connected in series.

The voltage applying circuit 150 includes a current limiting resistor 151 and a switch 153. The current limiting resistor 151 and the switch 153 are connected to each other in series. As the switch 153, a semiconductor switch such as an FET can be used.

One end of the voltage applying circuit 150 is connected to the positive external terminal 51 (a point A in FIG. 6, one side of current interruption device 53). The other end of the voltage interruption device is connected to the positive electrode (a point B in FIG. 6, the other side of the current interruption device 53) of the assembled battery 60. In other words, the voltage applying circuit 150 is connected in parallel to the current interruption device 53. When the switch 153 is closed, the voltage applying circuit 150 can apply a positive voltage of the assembled battery 60 to the positive external terminal 51 using the assembled battery 60 as a power source.

The control unit 121 monitors the state of the battery 50A based on an output of the current detection unit 54, an output of the voltage detection unit 130, and an output of the temperature sensor 55. That is, the control unit 121 monitors a current I, a total voltage Ev, a cell voltage Vs, and a temperature of the assembled battery 60.

The memory 123 stores a monitoring program for monitoring the state of the battery 50A, a power source recovery program at the time of the occurrence of a crash, and data necessary for executing these programs. The program may be stored in a recording medium such as a CD-ROM, and may be used, transferred, lent, or the like. The program can also be distributed using an electric communication line.

The management device 110 is connected to the vehicle ECU 30 via a communication connector 125 and the communication line L1, and communicates with the vehicle ECU 30 via CAN communication or LIN communication. The management device 110 can receive, from the vehicle ECU 30, information relating to an operation and a non-operation of the engine 20 that forms a drive device. In addition to the above-mentioned processing, the management device 110 can also receive information relating to the state of the automobile 10 such as traveling, stopping, and parking. The communication connector 125 may be mounted on the lid body 74 (see FIG. 2).

Furthermore, an acceleration sensor 15 is mounted on the automobile 10 (see FIG. 1). The acceleration sensor 15 detects a crash of the automobile 10 based on the measured acceleration. In a case where the vehicle ECU 30 illustrated in FIG. 6 detects a crash of the automobile 10, the vehicle ECU 30 transmits a crash notification to the battery 50A via the communication line L1.

2. External Short Circuit Caused by Vehicle Crash, and Recovery of Power Source

Figure 7:
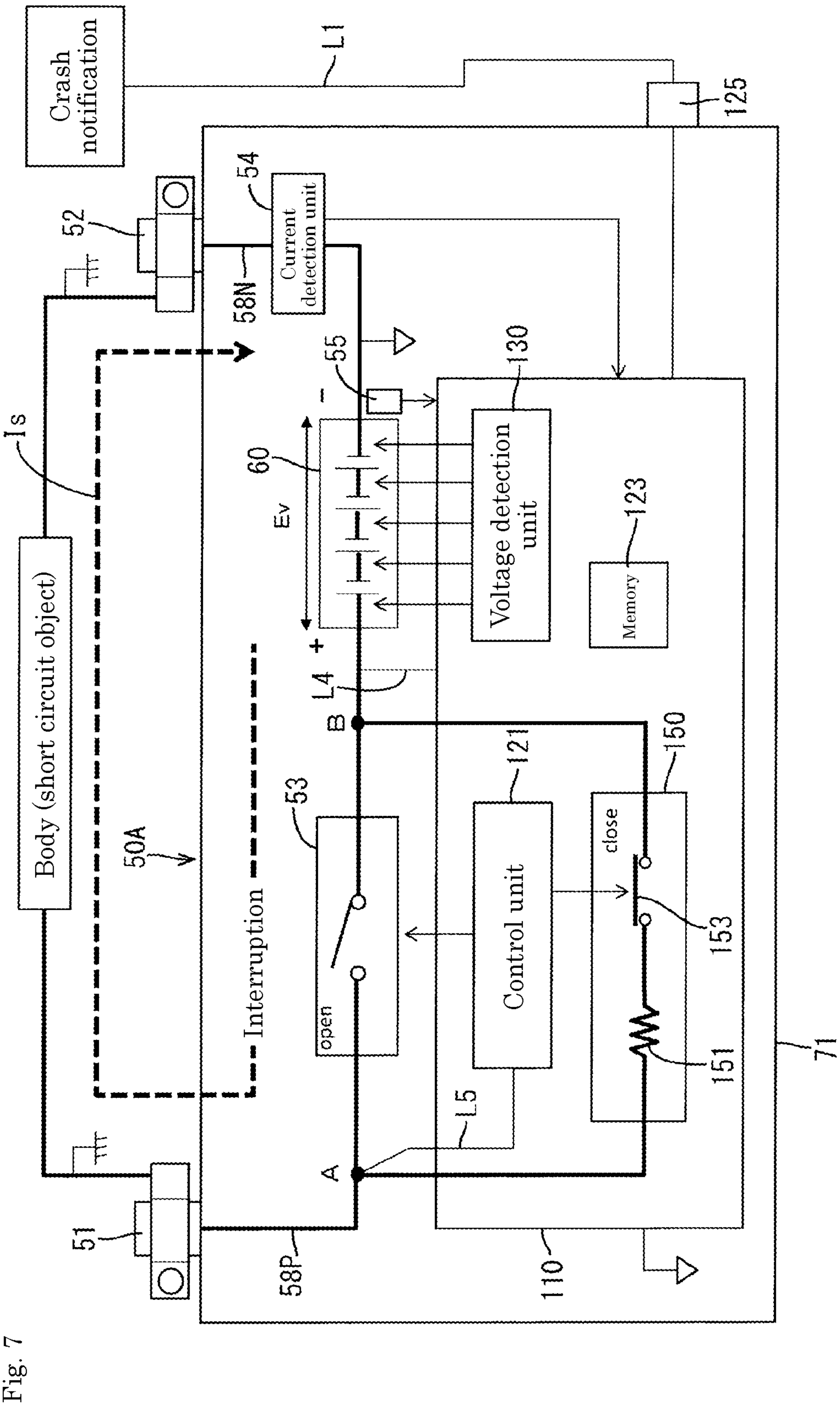
FIG. 7 is a block diagram illustrating a current path of a short-circuit current.

The negative external terminal 52 of the battery 50A is connected to a body of the automobile 10 that is at the reference potential. When the positive external terminal 51 comes into contact with the body due to an impact caused by a crash, there is a possibility that the positive external terminal 51 and the negative external terminal 52 are short-circuited via the body (see FIG. 7).

There may be a case where a short-circuit current Is that flows at this point of time becomes a large current of substantially several thousands A. If the flow of such a large current continues, components to which electricity is supplied such as the assembled battery 60 and the bus bar generate heat abnormally. Accordingly, it is difficult to secure the safety of the vehicle. Accordingly, in a case where a short-circuit current Is that exceeds a threshold flows, the control unit 121 opens the current interruption device 53 so as to interrupt the current. By performing such processing, it is possible to secure the safety of the battery 50A.

When a crash occurs, there is a possibility that the battery 50A is heavily damaged more than expected. In view of such circumstances, there has been proposed an idea that, even when an abnormal phenomenon such as an external short circuit is eliminated after the current is once interrupted, the interruption of the current is maintained so as to secure the safety of the battery 50A.

However, when the interruption of the current is maintained, a state is brought about where the supply of electricity to the automobile 10 (the vehicle load 27 and the vehicle ECU 30 illustrated in FIG. 5) is stopped. Accordingly, even when a vehicle has a post-crash function such as a hazard lamp or an emergency call, a driver cannot use such a post-crash function. Particularly, in a case where no other power sources except for the battery 50A are mounted on the automobile 10, such a problem becomes conspicuous.

In view of such circumstances, in this embodiment, when an external short circuit occurs due to a crash of the automobile 10, the current interruption device 53 is opened so as to interrupt a current. Then, when the external short circuit is eliminated, the current interruption device 53 is returned to a closed state, and the supply of electricity to the automobile 10 is resumed.

By performing such processing, a post-crash function can be used after the occurrence of a crash and hence, the safety of the automobile 10 can be enhanced.

The elimination of an external short circuit can be determined by the following steps, for example. In response to the detection of an external short circuit, the current interruption device 53 is opened so as to interrupt the short circuit current Is. Then, the switch 153 of the voltage applying circuit 150 is closed so as to apply a voltage to the positive external terminal 51 (see FIG. 7). The control unit 121 detects a voltage at the point A that is measured at the point of time via a signal line L5.

In a case where the external short circuit continues after the current interruption, a voltage at the point A is "zero V" as illustrated in FIG. 8. In a case where an external short circuit is eliminated, if the external short circuit is also interrupted from the vehicle load 27, a voltage at the point A is a "total voltage Ev" of the assembled battery 60. Accordingly, the elimination of an external short circuit can be determined based on a voltage measured at the point A.

3. Description of Power Source Recovery Processing

Figure 9:
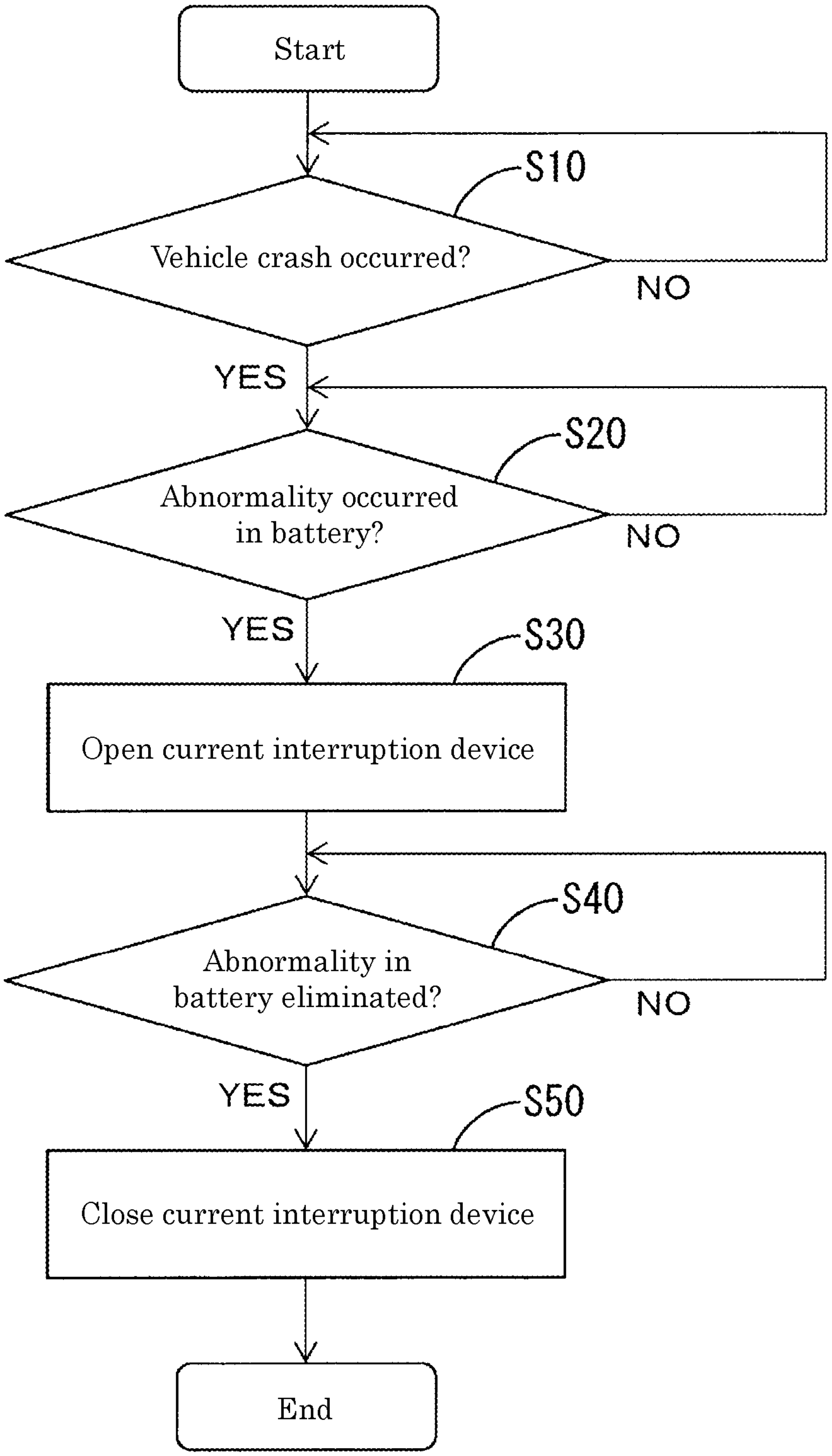
FIG. 9 is a flowchart of a power source restoring processing.

FIG. 9 is a flowchart of a power source recovery processing. The power source recovery processing includes five steps S10 to S50. The power source recovery processing is performed during activation of the management device 110 at a predetermined cycle in parallel with monitoring of the state of the battery 50A.

When the power source recovery processing is started, the control unit 121 firstly determines whether or not a crash has occurred on the automobile 10 (S10).

The occurrence of the vehicle crash can be determined based on whether or not the battery 50A has received a crash notification from the vehicle ECU 30. In a case where no accident has occurred on the automobile 10, no crash notification is transmitted from the vehicle ECU 30 to the battery 50A. Accordingly, it is determined that no vehicle crash has occurred, and a standby state is set (S10: NO).

In a case where an accident occurs on the automobile 10, the acceleration that exceeds a predetermined value is detected by the acceleration sensor 15. As a result, the vehicle ECU 30 detects a crash.

Upon detection of the crash, a crash notification is transmitted from the vehicle ECU 30 to the battery 50A, and the control unit 121 receives the crash notification. Upon receiving the crash notification, the control unit 121 can share information relating to the vehicle crash with the vehicle ECU 30, and determines that the vehicle crash has occurred (S10: YES).

Then, the control unit 121 determines whether there is an abnormality in the battery 50A (S20). In this embodiment, the presence or non-presence of an external short circuit is detected based on a current I of the assembled battery 60. When the positive external terminal 51 is brought into contact with the body of the vehicle due to an impact generated by a vehicle crash so that two external terminals 51, 52 are short-circuited. Then, the assembled battery 60 discharges a short-circuit current Is that exceeds a threshold.

When the current detection unit 54 measures a short-circuit current Is that exceeds a threshold, the control unit 121 determines that an external short-circuit has occurred (YES in S20).

Upon the detection of abnormality, (an external short circuit), the control unit 121 gives a command to the current interruption device 53 so as to changeover the current interruption device 53 from a closed state to an open state (S30). When the current interruption device 53 is opened, the short-circuit current Is is interrupted.

After the short-circuit current Is is interrupted, the control unit 121 determines whether or not the abnormality (the external short-circuit) is eliminated (step S40). The elimination of an external short circuit can be determined in such a manner that a voltage is applied to the positive external terminal 51 using the voltage applying circuit 150, and the control unit 121 determines the elimination of the external short circuit based on a voltage at the point A measured at this point of time.

When the control unit 121 determines that the abnormality (the external short circuit) has not been eliminated (S40: NO), the control unit 121 maintains the current interruption device 53 in an open state.

When the control unit 121 determines that the abnormality (the external short circuit) has been eliminated (S40: YES), the control unit 121 returns the current interruption device 53 to a closed state (S50). As a result, the supply of electricity to the automobile 10 that has been crashed is automatically resumed.

4. Description of Advantageous Effects

According to the present embodiment, even if an abnormality such as an external short circuit temporarily occurs in the battery 50A due to a crash of the automobile 10, by eliminating such an abnormality, the supply of electricity to the automobile 10 that has been crashed is automatically resumed. Accordingly, a driver can use a post-crash function such as a hazard lamp and an emergency call. Even with respect to the automobile 10 having no post-crash function, for example, in a case where the automobile 10 can travel after the occurrence of a crash, the automobile 10 that has been crashed can be moved to a safe place. Due to such processing, it is possible to enhance the safety of the automobile 10 after the occurrence of a crash.

As one of methods of recovering the current interruption device 53 in an open state, there is a method where a voltage is applied to the external terminals 51, 52 of the battery 50A by a device disposed outside the battery 50A. However, such a method requires an operation where a driver of the automobile 10 carries an external charger or the like to an area near the battery 50A and connects the external charger or the like to the external terminals 51, 52. Accordingly, the recovery of the battery 50A takes time. According to the present embodiment, after the elimination of an external short circuit, the current interruption device 53 can be automatically recovered and hence, the time until the recovery can be shortened.

Embodiment 2

Figure 10:
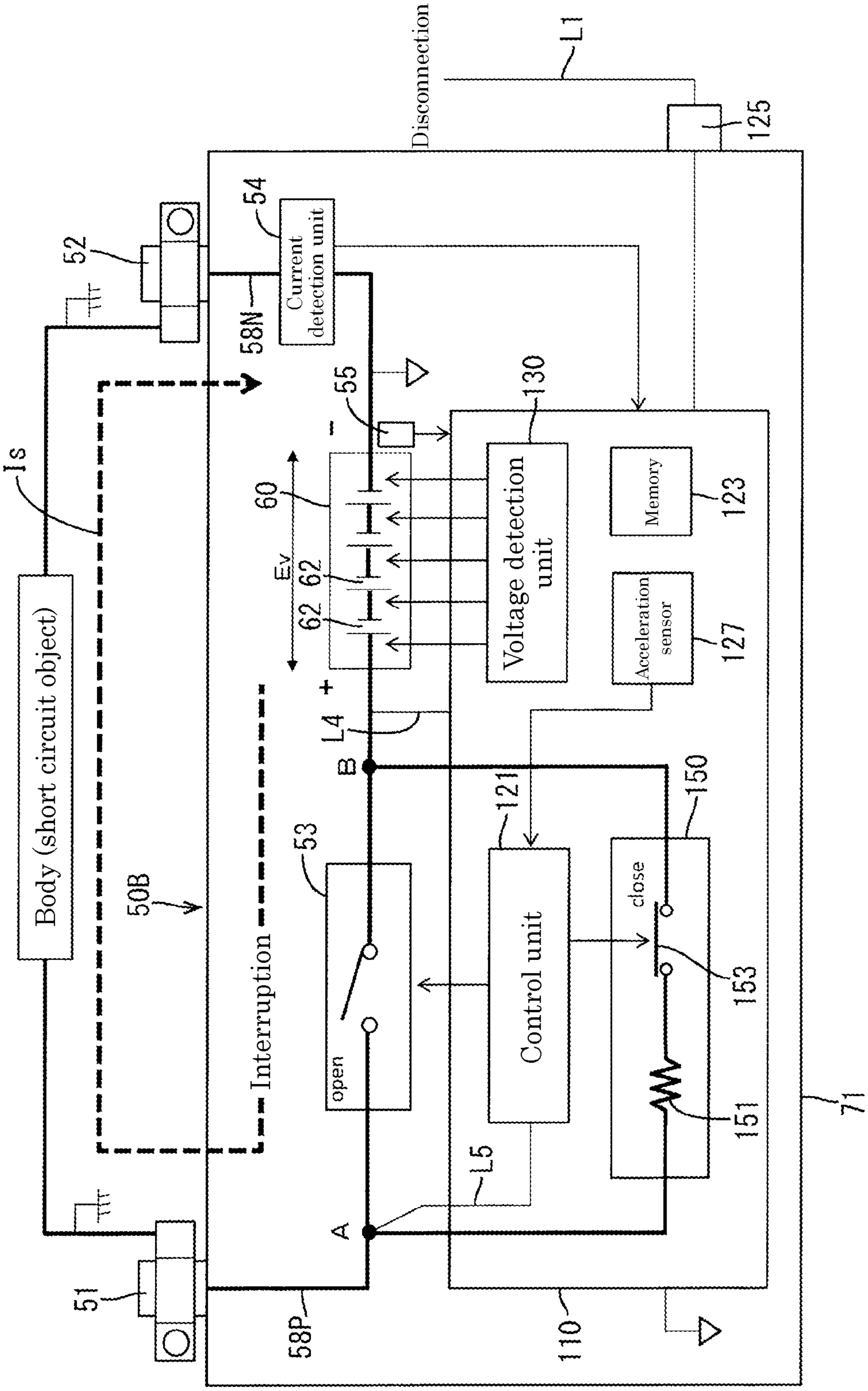
FIG. 10 is a block diagram of a battery.

As illustrated in FIG. 10, a battery 50B according to the embodiment 2 differs from the battery 50A of the embodiment 1 in that an acceleration sensor 127 is incorporated into the battery 50B.

The battery 50B measures acceleration with the built-in acceleration sensor 127, and autonomously detects the occurrence of the automobile 10. For example, when the acceleration sensor 127 measures the acceleration that exceeds a predetermined value, the battery 50B determines that the automobile 10 has been crashed.

In the battery 50B according to the embodiment 2, even in a case where the communication between the battery 50B and the vehicle ECU 30 is interrupted due to a disconnection or the like caused by the occurrence of crash of the automobile 10, it is possible to perform the power source recovery processing illustrated in FIG. 9 by autonomously detecting the occurrence of the crash of the automobile 10 by the built-in acceleration sensor 127. Accordingly, even if an abnormality such as an external short circuit occurs in the battery 50B due to a crash, by eliminating such an abnormality, the supply of electricity to the automobile 10 is automatically resumed. Accordingly, the safety of the automobile 10 after the occurrence of a crash can be enhanced without relying on functions of the vehicle ECU 30.

Embodiment 3

Figure 11:
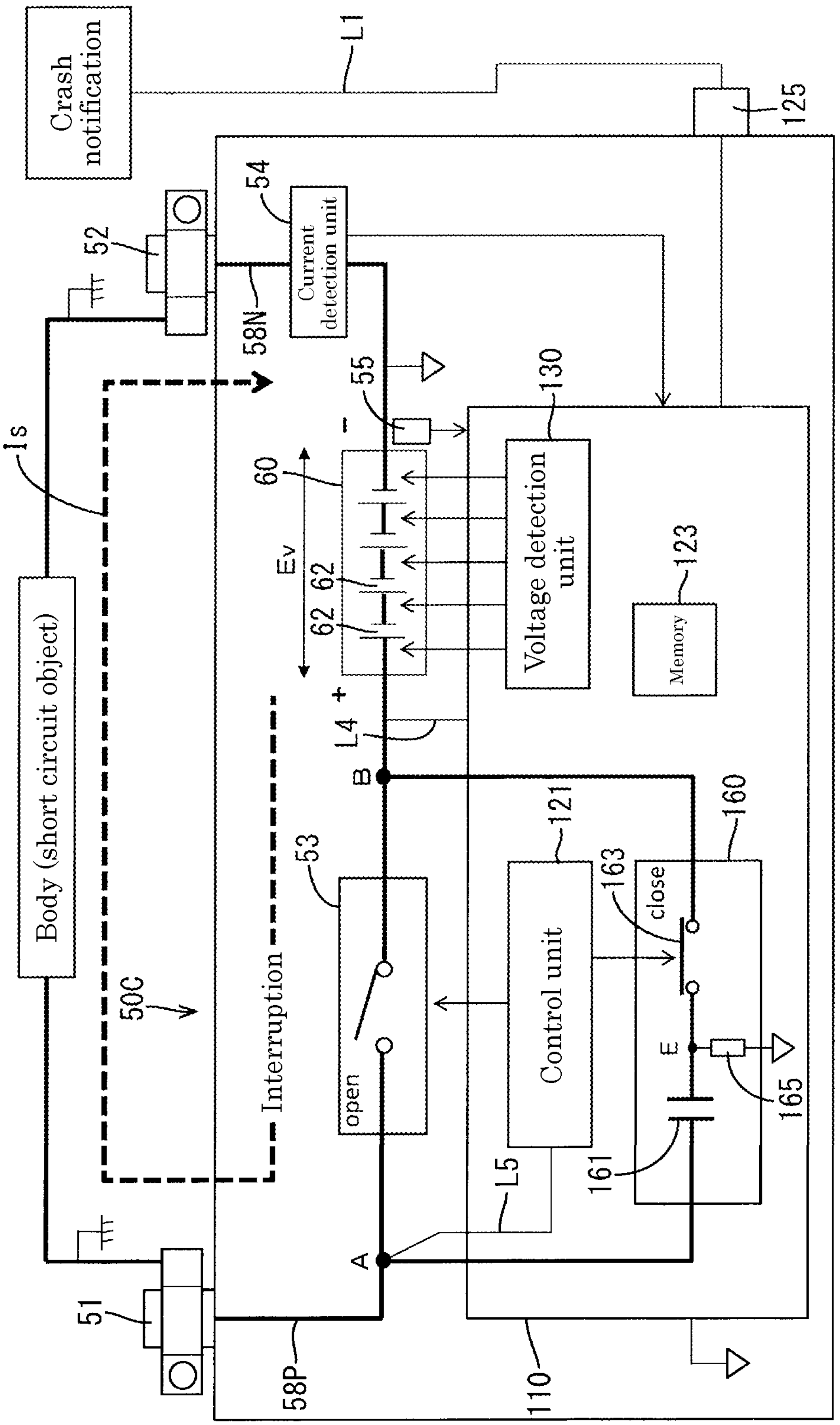
FIG. 11 is a block diagram of a battery.

As illustrated in FIG. 11, a battery 50C of the embodiment 3 differs from the battery 50A of the embodiment 1 with respect to the configuration of a voltage applying circuit 150. A voltage applying circuit 160 according to the embodiment 3 includes a capacitor 161, a switch 163, and a discharge resistor 165.

The capacitor 161 and the switch 163 are connected to each other in series. The capacitor 161 is connected to a point A in FIG. 11, and the switch 163 is connected to a point B in FIG. 11. The capacitor 161 and the switch 163 are connected in parallel to a current interruption device 53. The discharge resistor 165 has one end thereof connected to an intermediate connection point E between the capacitor 161 and the switch 163, and the other end thereof connected to a ground.

The discharge resistor 165 performs a function of discharging a charge that is charged in the capacitor 161 when the switch 163 is turned off.

In the battery 50C illustrated in FIG. 11, by turning on the switch 163 of the voltage applying circuit 160, a voltage of a positive electrode of an assembled battery 60 can be applied to a positive external terminal 51 (point A) using the assembled battery 60 as a power source.

Accordingly, substantially in the same manner as the embodiment 1, the elimination of an external short circuit can be determined in such a manner that, upon detection of the external short circuit, the current interruption device is opened so as to interrupt a current and, thereafter, a voltage is applied by the voltage applying circuit 160, and the elimination of the external short circuit is determined based on a voltage at the point A measured at a point of time that the voltage is applied by the voltage applying circuit 160.

Embodiment 4

Figure 12:
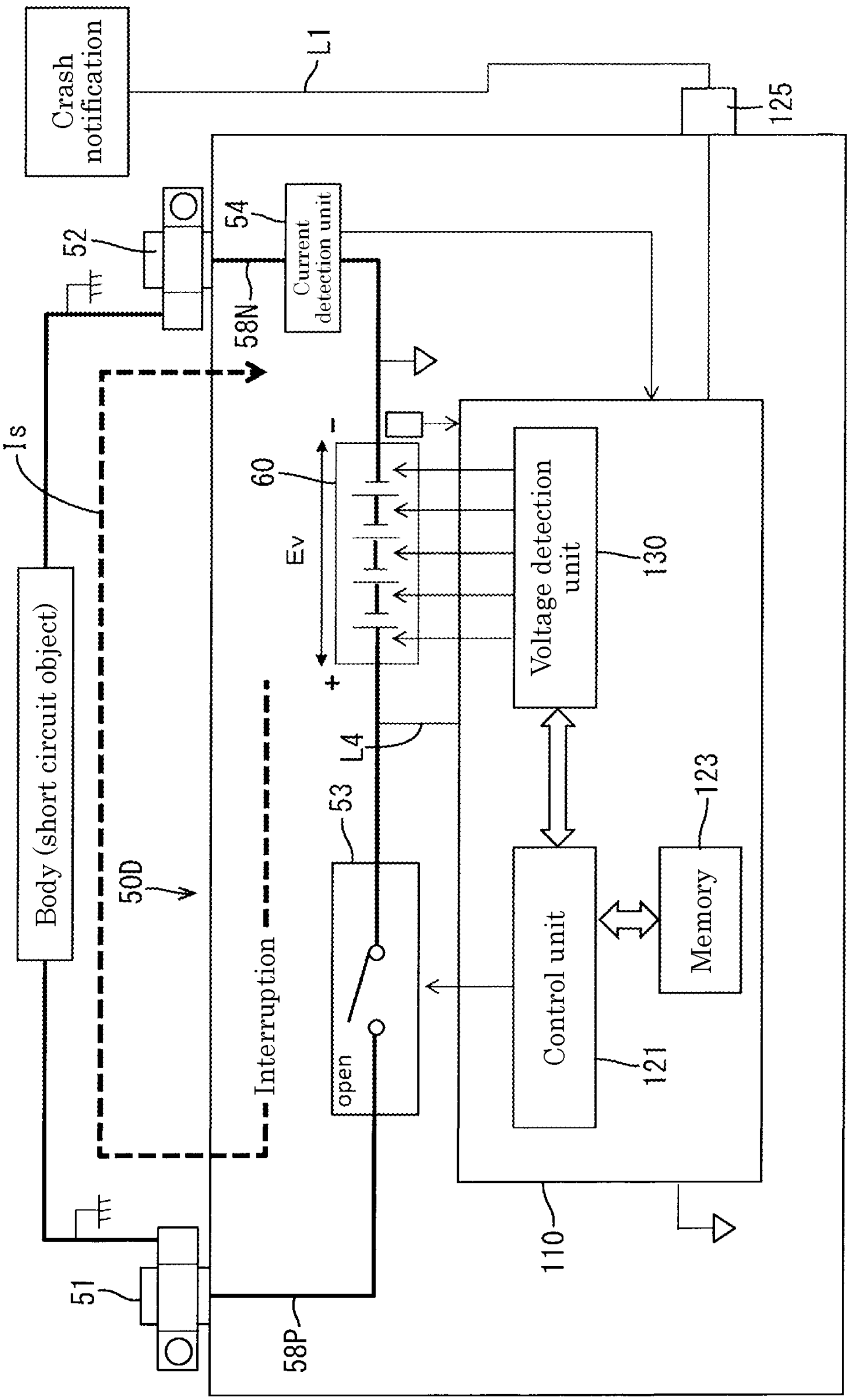
FIG. 12 is a block diagram of a battery.

As illustrated in FIG. 12, a battery 50D of the embodiment 4 differs from the battery 50A of the embodiment 1 with respect to a point that the battery 50D does not include the voltage applying circuit 150. The battery 50D of the embodiment 4 determines the elimination of an external short circuit based on the current I of an assembled battery 60.

When an external short circuit of the battery 50D is detected, in the same manner as the embodiments 1 to 3, the control unit 121 opens the current interruption device 53 so as to interrupt the short circuit current Is. After a lapse of several seconds to several ten seconds from the interruption of the short-circuit current Is, the control unit 121 brings the current interruption device 53 into a closed state, and measures a current value at the point of time by a current detection unit 54.

When a measured current value is equal to or more than threshold, the control unit 121 can determine that the external short circuit is continuing. On the other hand, when the measured current value is less than the threshold, the control unit 121 can determine that the external short circuit is eliminated. By repeatedly performing such determination of the measured current value after the interruption of a current at an interval of several seconds to several ten seconds without being limited to one time, the elimination of the external short circuit can be detected at a point of time that the external short circuit is eliminated.

With such a configuration, even when a battery 50D does not include a voltage applying circuit 150 or a voltage applying circuit 160, the elimination of an external short circuit can be determined and hence, the circuit can be simplified.

Other Embodiments

The present invention is not limited to the embodiments described with reference to the above description and drawings. For example, the following embodiments are also included in the technical scope of the present invention.

(1) The cell 62 is not limited to a lithium ion secondary battery, and may be other nonaqueous electrolyte secondary batteries or a lead-acid battery. The connection of the cells 62 are not limited to the case where the plurality of cells 62 are connected to each other in series and in parallel. The plurality of cells 62 may be connected to each other in series. The single cell 62 may be used. As the energy storage cell, a capacitor may be used in place of the secondary battery cell 62. The secondary battery cell and the capacitor are examples of the energy storage cell.

(2) In the above-mentioned embodiments 1 to 4, the battery is for an automobile. The battery is not limited to an automobile (four-wheeled vehicle), and may be a battery for a motorcycle. That is, the battery can be used for a vehicle such as an automobile or a motorcycle.

(3) In the embodiment 1, that technique of the present invention has been described by taking the case where abnormality of the battery 50A is detected after the detection of a vehicle crash as an example. The before-after order relationship between the detection of the vehicle crash and the detection of battery abnormality may be reversed. That is, the technique of the present invention is applicable to the case where the abnormality of the battery is detected first thus opening the current interruption device 53 and, thereafter, the crash is detected by the built-in acceleration sensor or the like. That is, the technique of the present invention is applicable to the case where the abnormality of the battery occurs together with the occurrence of the vehicle crash.

(4) In the embodiments 1 to 4, in the case where the battery 50 is externally short-circuited due to a crash of the automobile 10, a current is temporarily interrupted thus protecting the battery 50. Then, in the case where the external short circuit is eliminated, the current interruption device 53 is brought into a closed state, and the supply of electricity to the automobile 10 that has been crashed is resumed. Besides an external short circuit, this technique is also applicable to the case where any other abnormality has occurred in the battery 50.

(5) In the embodiment 1, when the acceleration sensor 15 mounted on the automobile detects a vehicle crash, a "crash notification" is transmitted from the vehicle ECU 30 to the battery 50A. In the case where, after the occurrence of a vehicle crash, the current interruption device 53 is opened thus interrupting a current for protecting the battery, prior to performing the interruption, "current interruption information" is transmitted from the battery 50A to the vehicle ECU 30 so that "current interruption information" is shared by the battery 50A and the vehicle ECU 30. By transmitting the "current interruption information" from the battery 50A to the vehicle ECU 30 in advance, a driver can select an emergency action on the premise of the interruption of a current.

(6) When the battery receives a crash notification from the vehicle ECU 30, the battery may receive not only information relating to the presence or the non-presence of a crash but also information relating to the degree of the crash, an amount of electricity required for ensuring the safety of an automobile and the like. In this case, the control unit 121 may change over the determination reference at which the current interruption device 53 is returned to a closed state from an open state based on the obtained information.

For example, in a case where the level of a crash is light so that the urgency is low, the first determination reference is selected where the supply of electricity is resumed after waiting for the confirmation of the safety of the battery. In a case where the level of crash is serious so that the urgency is high, the confirmation of the safety of the battery is retained at a minimum level, and the second determination reference is selected where the supply of electricity to the vehicle that has been crashed is resumed earlier than the case the supply of electricity is resumed based on the first determination reference. As a specific example of the first determination reference and the second determination reference, the following determination reference may be named. That is, on a condition that a state where an abnormality is eliminated continues for a predetermined time, in a case of performing a control for returning the current interruption device from an open state to a closed state, a length of the predetermined time is changed. That is, compared to the first determination reference, the predetermined time can be shortened when the second determination reference is adopted and hence, the supply of electricity to the vehicle that has been crashed can be performed earlier.

Figure 13:
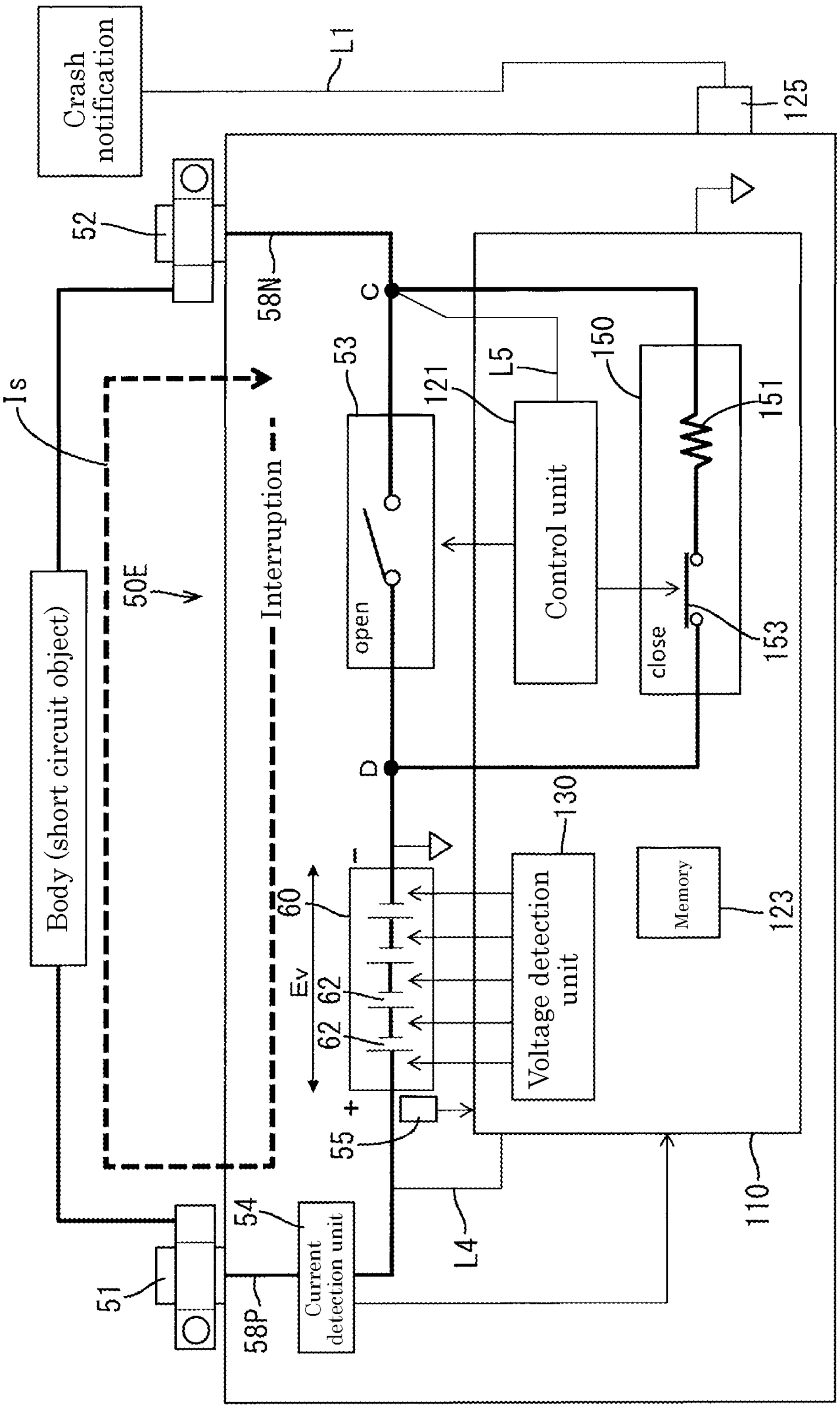
FIG. 13 is a block diagram of a battery.

(7) In the embodiment 1, the current interruption device 53 is disposed on the positive electrode of the assembled battery 60, and the current detection unit 54 is disposed on the negative electrode of the assembled battery. As illustrated in FIG. 13, the current detection unit 54 may be disposed on the positive electrode of the assembled battery 60, and the current interruption device 53 may be disposed on the negative electrode of the assembled battery 60. In this case, the state of the battery 50E can be determined by applying a voltage of the negative electrode of the assembled battery 60 to a point C by the voltage applying circuit 150 and by measuring the voltage. When an external short circuit occurs, a voltage at the point C becomes equal to the voltage Ev of the positive electrode of the assembled battery 60. When the external short circuit is eliminated, if the battery 50E is interrupted from the vehicle load 27, the voltage at the point C becomes equal to a voltage 0V of the negative electrode of the assembled battery 60. Accordingly, the elimination of an external short circuit can be determined based on a voltage at the point C.

(8) In the embodiment 1, it is assumed that the battery 50 is interrupted from the vehicle load 27. Accordingly, the description has been made such that, when an external short circuit is eliminated at the time of applying a voltage using the voltage applying circuit 150 after the interruption of a current, a voltage at the point A is equal to a total voltage Ev of the assembled battery 60. On the other hand, in a case where the battery 50 is not interrupted from the vehicle load 27, the voltage at the point A becomes a voltage Ev×K that is obtained by multiplying a total voltage Ev of the assembled battery 60 by a voltage dividing ratio K. The voltage dividing ratio is a resistance ratio between the current limiting resistor 151 of the voltage applying circuit 150 and the vehicle load 27.

As described above, a voltage measured at the point A differs depending on the state of the vehicle load 27. However, the generation of a change in voltage in the voltage at the point A is shared in common between the case where an external short circuit is continued and a case where the external short circuit is eliminated regardless of whether the vehicle load 27 is interrupted or not interrupted from the battery 50A. Accordingly, even when the vehicle load 27 is not interrupted from the battery 50A, it is possible to determine whether the external short circuit is eliminated based on the voltage at the point A.

The invention claimed is:

1. An energy storage apparatus comprising:

an energy storage cell;

a current interruption device configured to interrupt a current to the energy storage cell; and a control unit, wherein the control unit is configured to:

interrupt a current by opening the current interruption device in a case where abnormality of the energy storage apparatus is detected due to a vehicle crash; and resume supply of electricity to a vehicle, which has been crashed, by closing the current interruption device in a case where the abnormality is no longer detected.

2. The energy storage apparatus according to claim 1, wherein the energy storage apparatus is configured to provide electricity for performing a post-crash function of the vehicle or electricity for performing an emergency action of the vehicle in a case where supply of electricity is resumed.

3. The energy storage apparatus according to claim 2, further comprising a pair of external terminals that is electrically connected with the energy storage cell, the external terminals being provided for connecting a vehicle load to the energy storage apparatus, wherein the abnormality is a short circuit between the pair of external terminals caused by a vehicle crash.

4. The energy storage apparatus according to claim 2, wherein the control unit is connected with a vehicle ECU by communication, and shares information relating to a vehicle crash with the vehicle ECU.

5. The energy storage apparatus according to claim 2, wherein:

the energy storage apparatus incorporates an acceleration sensor therein, and the control unit is configured to detect a vehicle crash based on a measured value of the acceleration sensor.

6. The energy storage apparatus according to claim 1, further comprising a pair of external terminals that is electrically connected with the energy storage cell, the external terminals being provided for connecting a vehicle load to the energy storage apparatus, wherein the abnormality is a short circuit between the pair of external terminals caused by a vehicle crash.

7. The energy storage apparatus according to claim 6, wherein the control unit is connected with a vehicle ECU by communication, and shares information relating to a vehicle crash with the vehicle ECU.

8. The energy storage apparatus according to claim 6, wherein:

the energy storage apparatus incorporates an acceleration sensor therein, and the control unit is configured to detect a vehicle crash based on a measured value of the acceleration sensor.

9. The energy storage apparatus according to claim 1, wherein the control unit is connected with a vehicle ECU by communication, and shares information relating to a vehicle crash with the vehicle ECU.

10. The energy storage apparatus according to any one of claim 1, wherein the energy storage apparatus incorporates an acceleration sensor therein, and the control unit is configured to detect a vehicle crash based on a measured value of the acceleration sensor.

11. A method of controlling a current interruption device, comprising:

interrupting a current by opening the current interruption device in a case where abnormality of an energy storage apparatus is detected due to a vehicle crash; and resuming supply of electricity to a vehicle, which has been crashed, by closing the current interruption device in a case where the abnormality is no longer detected.

* * * * *